United States Patent [19]
Uhl et al.

[11] Patent Number: 5,774,419
[45] Date of Patent: Jun. 30, 1998

[54] HIGH SPEED POINT DERIVATIVE MICROSEISMIC DETECTOR

[75] Inventors: James Eugene Uhl; Norman Raymond Warpinski; Ernest Blayne Whetten, all of Albuquerque, N. Mex.

[73] Assignee: Gas Research Institute, Chicago, Ill.

[21] Appl. No.: 665,471

[22] Filed: Jun. 18, 1996

[51] Int. Cl.$^6$ .................................................. G01V 1/28
[52] U.S. Cl. ........................... 367/38; 340/690; 364/421; 367/36
[58] Field of Search .................... 367/36, 38; 340/690; 181/122; 364/421

[56] References Cited

U.S. PATENT DOCUMENTS

| | | | |
|---|---|---|---|
| 3,930,145 | 12/1975 | Fort et al. | 235/151.3 |
| 3,949,353 | 4/1976 | Waters et al. | 367/36 |
| 3,992,672 | 11/1976 | Fasching | 324/76.22 |
| 4,066,992 | 1/1978 | Buller et al. | 367/36 |
| 4,314,347 | 2/1982 | Stokely | 364/574 |
| 4,516,206 | 5/1985 | McEvilly | 364/421 |
| 4,566,083 | 1/1986 | Thigpen | 367/21 |
| 4,611,312 | 9/1986 | Ikeda | 367/38 |
| 4,635,238 | 1/1987 | Gallagher et al. | 367/40 |
| 4,648,039 | 3/1987 | Devaney et al. | 364/421 |
| 4,686,657 | 8/1987 | Dellinger et al. | 367/75 |
| 4,701,891 | 10/1987 | Castagna et al. | 367/31 |
| 4,759,636 | 7/1988 | Ahern et al. | 367/21 |
| 4,870,580 | 9/1989 | Lang et al. | 364/421 |
| 4,885,711 | 12/1989 | Neff | 364/574 |

OTHER PUBLICATIONS

"ASP: An Automated Seismic Processor For Microearthquake Networks", T.V. McEvilly and E.L. Majer, Bulletin of the Seismological Society of America, vol. 72, No. 1. pp. 303–325, Feb. 1982.

"A New Event Detector Designed for the Seismic Research Observatories", James N. Murdock and Charles R. Hutt, United States Department of the Interior Geological Survey, Report 33–785, Oct. 1983.

"Influence of the Bandpass Filtering and Model Order on the Autoregressive Seismic Detection in the Real–Time Domain", T.H. Burghardt and I. Savin, Computers and Geosciences, vol. 19, No. 2., pp. 111–115, 1993.

*Primary Examiner*—Ian J. Lobo
*Attorney, Agent, or Firm*—Greer, Burns & Crain, Ltd.

[57] ABSTRACT

A high speed microseismic event detector constructed in accordance with the present invention uses a point derivative comb to quickly and accurately detect microseismic events. Compressional and shear waves impinging upon microseismic receiver stations disposed to collect waves are converted into digital data and analyzed using a point derivative comb including assurance of quiet periods prior to declaration of microseismic events. If a sufficient number of quiet periods have passed, the square of a two point derivative of the incoming digital signal is compared to a trip level threshold exceeding the determined noise level to declare a valid trial event. The squaring of the derivative emphasizes the differences between noise and signal, and the valid event is preferably declared when the trip threshold has been exceeded over a temporal comb width to realize a comb over a given time period. Once a trial event has been declared, the event is verified through a spatial comb, which applies the temporal event comb to additional stations. The detector according to the present invention quickly and accurately detects initial compressional waves indicative of a microseismic event which typically exceed the ambient cultural noise level by a small amount, and distinguishes the waves from subsequent larger amplitude shear waves.

16 Claims, 7 Drawing Sheets

TRIP LEVEL=(NOISE DERIV X THRESHOLD)$^2$

CW IS THE COMB WIDTH-THE NUMBER OF SAMPLE POINTS IN THE COMB

CT IS THE COMB TRIP NUMBER-THE NUMBER OF SAMPLE POINTS WHICH MUST BE GREATER THAN THE TRIP LEVEL

VALID_EVENTS KEEPS COUNT OF NUMBER OF STATIONS ON WHICH THE EVENT IS DETECTED

CS IS THE START STATION FOR THE SPATIAL COMB

CE IS THE END STATION FOR THE SPATIAL COMB

CJUMP IS A SKIP FACTOR SO THAT EVERY STATION NEED NOT BE TESTED

VALUES FOR CS, CE, AND CJUMP ARE CHOSEN DEPENDING ON THE NUMBER OF STATIONS, THE PROCESSING CAPABILITY OF THE COMPUTER, AND OTHER FACTORS

CWS IS THE SIZE OF THE COMB WIDTH IN NUMBER OF SAMPLE POINTS (EVENTS MAY OCCUR LATER IN TIME AT OTHER STATIONS)

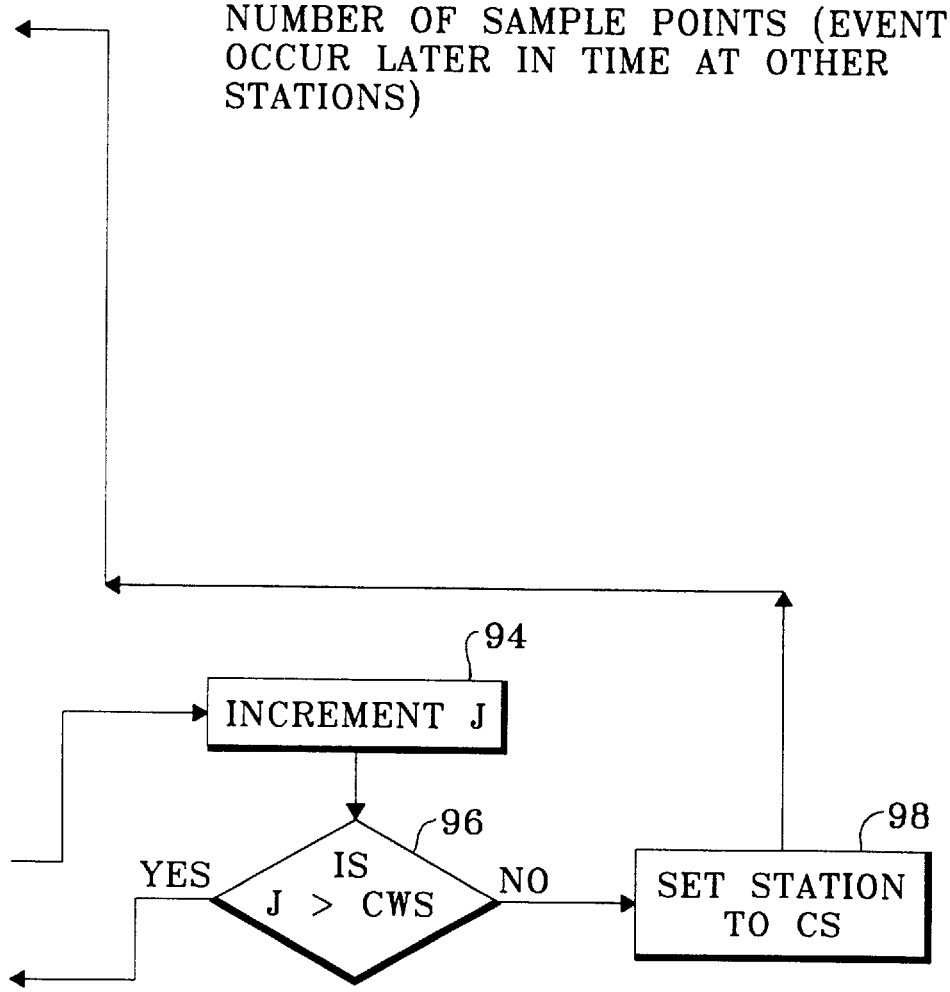

Fig. 4B

HIGH SPEED POINT DERIVATIVE MICROSEISMIC DETECTOR

This invention was made with Government Support pursuant to Contract No. DE-AC-04-94AL85000 awarded by the Department of Energy. The government has certain rights in this invention.

BACKGROUND OF THE INVENTION

The present invention concerns a microseismic event detector for accurately and efficiently detecting the beginning of a microseismic event, and for distinguishing the characteristic initial compressional wave of the microseismic event from ambient noise fluctuations and remaining waves in the microseismic event. A detector constructed in accordance with the present invention automatically identifies and discriminates microseismic events using point derivative based information analysis over temporal and spatial ranges after assurance of sufficient quiet periods.

Underground phenomena in numerous scientific fields are monitored through obtainment and analysis of seismic data. Numerous commercial and scientific endeavors rely upon the detection of micro-earthquakes, known as microseisms, to investigate various underground events. Receivers, such as geophones and accelerometers, are disposed in the ground so that seismic waves propagate to and impinge upon the detectors. Over time, the receivers produce an extremely large volume of data, especially when a large number of receivers is used. Individual microseisms must be distinguished from the ambient noise in the large volumes of data, and discriminated from other events within the volumes of data.

Of particular interest is the beginning of a microseismic event, indicated by an initial compressional wave (P-wave) which slightly exceeds the ambient noise level. The initial compressional wave is typically followed by larger shear waves (S-waves). Common techniques for detecting microseismic events rely upon amplitude analysis over averaging windows. In such averaging techniques, the data required for the small initial compressional wave is typically lost when it is combined with other data within an averaging window, allowing the event to be determined, but impairing the ability of the technique to accurately detect the initial arrival of the microseismic events. The shifting of the window through collected data and constant need to average the data over the window also slows the window averaging techniques, impairing the ability of the techniques to conduct an automatic and efficient on location analysis of the microseismic data.

Defining narrow selective windows which ignore portions of point data speeds processing, but sacrifices a measure of sensitivity or accuracy because potentially significant point microseismic data is ignored. While microseismic events will be detected, the precise commencement of the events will not be accurately and automatically detected. When a large number of channels, corresponding to individual detectors, is used to enhance accuracy or provide additional data through which statistical analysis may serve to reduce error, the speed of the processes are further slowed. In part, this can be addressed through use of sophisticated and fast upper level computers, but such computers are generally expensive and are not readily adapted to study of events on location. An explanation of the window-average techniques is found in U.S. Pat. No. 4,885,711, entitled DATA PROCESSING to Neff.

Numerous commercial and scientific applications would benefit from an ability to automatically and quickly detect the commencement of microseismic events on location. A particular application which would benefit and which is utilized primarily in natural gas field extraction is the hydraulic fracturing technique. Many gas fields have a permeability that is too low to effectively produce gas in economic quantities. The hydraulic fracturing technique addresses this problem by purposefully creating fractures in the gas fields that provide conduits to enhance gas flow. Fluid and sand are then pumped into wells at sufficient pressure to fracture the rock, the fluid transports sand into the fracture, and the sand settles in the created fractures. Production of gas is accelerated as a result of improved capability for flow within the reservoir.

Similarly, water flooding of largely expended oil fields seeks to push oil to other wells where it is produced. Fractures are often created in this process which direct the oil in a potentially unknown direction. In this process, water, or possibly steam, is used to increase pressure and/or temperature to displace the oil to a more favorable production location.

Microseismic detection is utilized in conjunction with hydraulic fracturing or water flooding techniques to map created fractures. Typically, detectors are placed at a fixed distance from the field before fracturing is commenced. However, the precise length, direction, and height of the created fractures will not be obtainable unless the beginnings of microseismic events are accurately detected. Introduction of the fluids and sand is complicated by the inability to accurately determine the location and dimensions of the fractures.

This inability to accurately determine fracture location and dimension also creates similar difficulties in related techniques such as detection of leaks in emptied gas fields used as storage reservoirs. Cost and efficiency of such reservoirs are affected by the ability to remove the gas from the reservoir and the amount of loss due to gas leaking through fractures in the reservoir. Both the ability to remove the gas and leakage may be adversely affected by unwanted reservoir cracks or fractures, and the particular location of the cracks and fractures. Unless accurate location and dimension information concerning the cracks is obtained, objective assessment of an emptied field's continued practicability to function as a storage reservoir cannot be made.

Many other commercial and scientific techniques would benefit from efficient on site microseismic event detection which accurately detects the commencement of microseismic events and distinguishes the beginning characteristic compressional wave from subsequent waves. For instance, earthquake research would be rendered more accurate and produce better epicenter location information. Similarly, accuracy of the monitoring of underground nuclear explosions being conducted by potentially hostile foreign entities would be improved. Valuable warning could be provided concerning rock bursts which lead to mine collapses, to allow safe evacuation of mines prior to fatal collapse of the mine structure. These and other important applications of high speed accurate microseismic event detection will be readily apparent to those skilled in the art.

Accordingly, an object of the present invention is to provide an accurate high speed point based microseismic detector capable of automatically identifying and discriminating an initial compressional wave indicative of the beginning of a microseismic event.

Another object of the present invention is to provide an accurate high speed point based microseismic detector using a temporal and spatial comb to detect microseismic events.

An additional object of the present invention is to provide an accurate high speed point based microseismic detector which assures a quiet period prior to declaring a microseismic event based upon a point derivative temporal and spatial analysis.

A still further object of the present invention is to provide an accurate high speed point based microseismic detector for automatically detecting the arrival of intermittent coherent microseismic waves appearing on a linear array of receivers in the presence of significant levels of noise, and having a temporal and spatial analysis control process which can be implemented in a personal computer while still analyzing numerous signal detection channels.

Yet another object of the present invention is to provide an accurate high speed point based microseismic detector for automatically declaring microseismic events and accurately discriminating characteristic initial compressional wave arrival which assures that waves from a previous event do not interfere with detection of the arrival of compressional waves from a subsequent event.

Still another object of the present invention is to provide an accurate high speed point based microseismic detector for automatically declaring microseismic events and accurately discriminating compressional wave arrival which determines ambient noise level, assures a quiet period corresponding to the ambient noise level prior to conducting event detection, combs through time using a two point derivative squared transform to evaluate initial compressional wave arrival on individual receivers among an array of receivers, and combs through space using the temporal comb on multiple receivers among the array of receivers to confirm a microseismic event detected on an individual receiver.

SUMMARY OF THE INVENTION

A microseismic detector constructed in accordance with the present invention conducts high speed detection of microseismic events through point data analysis. A number of seismic receiver stations are disposed at desired locations for sensing microseismic waves. Waves impinging upon the receivers are converted for analysis into electrical signals. Event detection is conducted using a point derivative based temporal analysis. Events detected on a given receiver station are confirmed by shifting the temporal analysis spatially to other receiver stations.

Preferably, processor analysis of detected receiver signals according to the present invention begins with the determination of an ambient noise level. Noise level is determined over a period of time by analyzing two point squared derivatives. Having determined the ambient noise level, the processor detects and distinguishes initial compressional waves of a microseismic event through use of a temporal comb. The temporal comb uses the squared two point derivatives to emphasize signal characteristics from noise. If combing reveals a number of squared derivatives which exceed a trip threshold over a given width in time, then a trial event indicating a potential beginning compressional wave of a microseismic event is declared. The trial event is tested by a spatial comb which applies the temporal comb to another receiver channel to verify occurrence of the microseismic event. If the microseismic event is confirmed through the spatial comb, the microseismic event is declared valid, and other storage and analysis may be applied to the collected data.

Excellent detail is obtained through use of a high resolution and high speed analog to digital converter, which converts the analog electrical signals of the individual receivers. Preferably, the converter has at least an 8000 sample per second conversion rate and a resolution of twenty bits. Additionally, each receiver station may be comprised of multiple directional receivers. For instance, three directional receivers allow detection along separate X, Y and Z directional axes. If microseismic waves of interest are known to be disposed in a given direction from the receivers, temporal comb derivative analysis may be limited to the particular axial directions of interest.

The desired type of information to be obtained from the microseismic detection according to the present invention will affect the number of receiver stations used. As an example, a hydraulic fracturing test would typically require distance, elevation, and time of origination information for a useful study. Solution for these three variables requires information from three receiver stations, however, five receiver stations are preferred as a minimum number to provide sufficient additional information for statistical reduction of errors. Even if the spatial comb is set to confirm events on a significant number of receiver stations, and a significant number of receiver stations are then used to provide data for analysis of detected events, the rapid two point derivative temporal analysis achieves real time data point analysis without high level processor requirements, thereby allowing easy on-location implementation using personal computers for processing functions.

BRIEF DESCRIPTION OF THE DRAWINGS

Other features, advantages and objects of the invention will be readily apparent to those skilled in the art by reference to the detailed description and drawings, of which.

DETAILED DESCRIPTION OF THE PREFERRED EMBODIMENT

Figure 1:
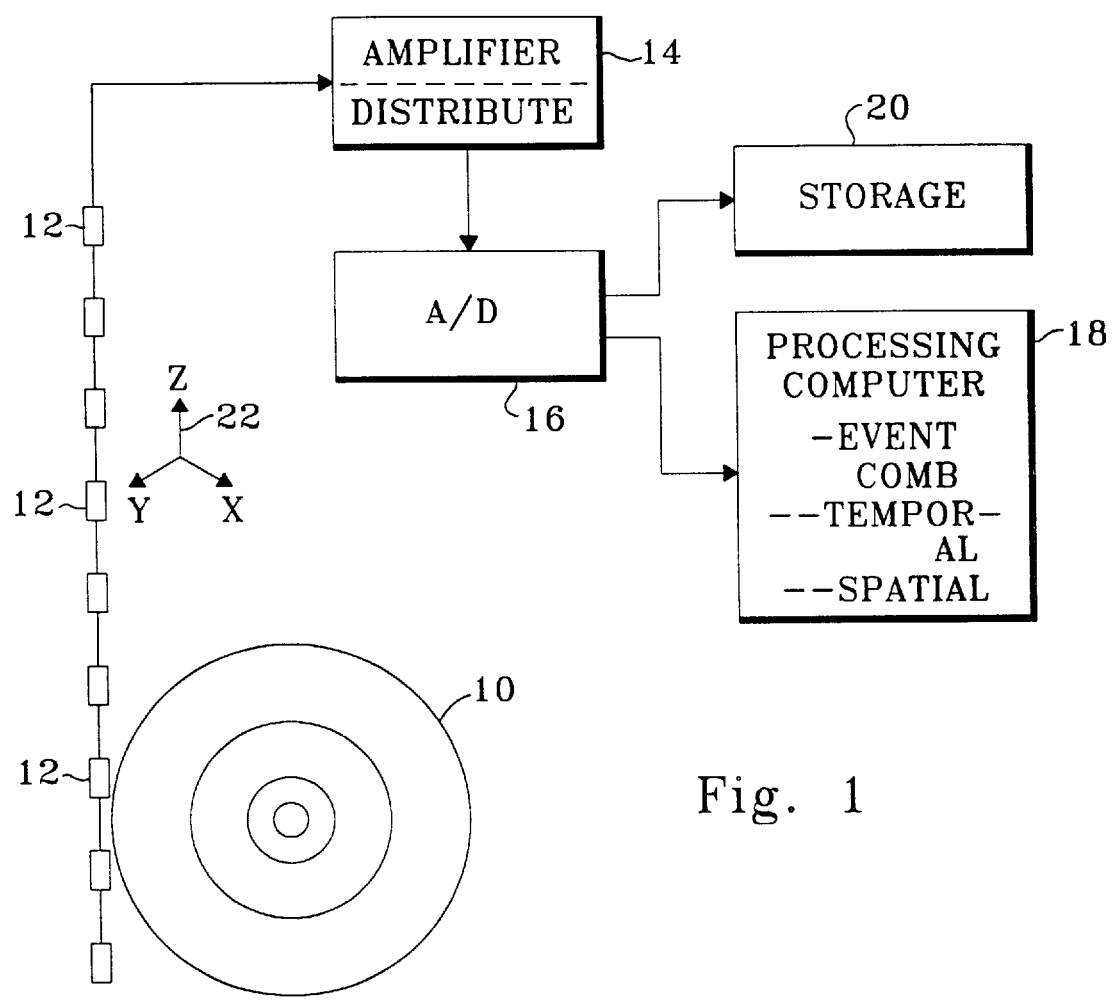
FIG. 1 is a hardware block diagram of a microseismic event detector constructed in accordance with the present invention.

FIG. 1 shows a microseismic event detector constructed in accordance with the present invention. The detector accurately detects microseismic waves 10 on a high speed basis even when the level of noise is significant, and may distinguish initial compressional waves indicative of the commencement of a microseismic event. Waves impinging upon receiver stations 12 are detected and amplified by an amplifier 14, converted to digital signals by an analog to digital converter 16, and analyzed by a processing computer 18 which can execute a high speed event comb derivative point analysis algorithm. Collected data may also be archived in a storage memory 20, such as a tape backup memory.

The microseismic waves 10 are sensed by a plurality of the microseismic receiver stations 12, forming an array of receivers, disposed so that the microseismic waves will propagate to and impinge upon the receiver stations 12. The type of receiver chosen will depend upon the frequency of the event to be detected, For instance, underground fracturing techniques generate microseismic waves of high frequency. Accordingly, the preferred receiver 12 is an accelerometer. In an application where high frequency information is less important, such as earthquake seismology or surface monitoring, some cost savings might be realized by employing a lower frequency geophone as the receivers within receiver stations 12. Lower frequency detection allows a greater distance between the receiver stations 12 and events because the higher frequency seismic waves are attenuated in a relatively short distance in the ground. However, increased resolution is gained in the higher frequencies, and is more appropriate for hydraulic fracturing and other applications.

A desired amount of independent information, as well as the degree of accuracy of the information to be obtained from the microseismic waves 10 will affect the minimum number of receiver stations 12 needed in the receiver array. In a number of applications, including the hydraulic fracturing technique, important information includes the elevation of the waves with regard to a receiver station 12, and the distance away from a given receiver station 12. Time of origination of the wave may also be important. Solution for the three unknown variables requires that signals be provided from three separate receiver stations 12, the separate signals from 3 receivers providing information for a matrix of three equations from which the three variables may be determined. For instance, an unknown elevation $Z_0$, radial distance $r_0$, and time of origination to are related by the sensed voltage amplitude at a receiver station 12 as follows, where $t_i$ is the time of arrival:

$$v(t_i - t_0) = \sqrt{(z_i - z_0)^2 + (r_i - r_0)^2}$$

By examining the signal at three receiver stations 12, the three unknowns may be obtained. Preferably, the number of receiver stations 12 will exceed the minimum number, however, since additional receivers will allow implementation of statistical analysis to reduce potential error in determination of the desired variables. Regression and correlation theory, for instance, require additional data from additional receiver stations 12. Accordingly, if three variables related to distance, elevation, and time of origination are to be determined, at least five receivers are preferred to permit statistical reduction of error in subsequent calculations from the signal data. The upper limit of receivers will be governed by cost, and by the processing speed of the processing computer 18.

While the statistical techniques for solving for variables in a detected microseismic signal are generally known, significant error and difficulty is introduced by the inability to automatically and accurately determine the commencement of a microseismic event. Such an event is indicated by a small amplitude compressional wave which typically exceeds the noise level by only a small amount. Known averaging window techniques lump the point data necessary for accurate determination of the initial compressional wave into a sum with higher amplitude subsequent waves, and accordingly sacrifice information provided in the small initial compressional wave.

That amount of data quickly becomes large in an array of receivers providing a continuous stream of sensed microseismic data. Given the amount of data, many techniques rely upon subsequent analysis of stored data, either manually or automatically, and abandon contemporaneous on site detection. Further escalation of the data amount occurs when individual receiver stations 12 includes separate directional receivers, preferably accelerometers, disposed to sense waves 10 along separate coordinate X, Y, and Z axes 22 corresponding to directional receivers. Such a preferred arrangement of directional receivers as the receiver stations 12 provides data for solution in three dimensional vector space, or along any selected coordinate axis or two-dimensional space. In such an arrangement, each of the receiver stations 12 forms three channels corresponding to each of the directional receivers. According to the present invention, even the multi-channel arrangement, which provides excellent analytical flexibility and valuable vectoral information, may be automatically searched on a high speed basis for initial compressional waves indicative of the beginning of a microseismic event, using the processing computer 18 driving temporal and spatial point derivative based combs.

Electrical signals from the separate channels of each of the receiver stations 12 are separately amplified by the amplifier 14, which distributes the separate receiver channels via separate signal wires to amplification channels in the amplifier 14. Since output signals of the receiver channels may be relatively small compared to intervening noise in the receiver output lines, the amplifier 14 is preferably a differential amplifier with an excellent common mode rejection ratio. Output leads for each of the receiver channels comprise two wires for providing an output voltage between the two wires. Any interference produced in the wires will be rejected by the amplifier 14 as common to the two wires, while the relatively small output signal from each receiver channel will be amplified.

Still in analog form, amplified receiver signal data is output from the amplifier 14 to the analog to digital converter 16. The converter 16 includes parallel sample and hold conversion for each of the receiver channels. Resolution of the converter 16 is preferably at least 20 bits, and the rate of digitization is preferably at least 8,000 samples per second. The selected resolution and rate allow detection of a frequency up to about 3000 Hz. Temporal resolution is enhanced when the conversion rate of the converter 16 is increased because the converter 16 will produce digital data more closely following the analog signal data. Amplitude resolution is enhanced by higher bit resolutions which more precisely quantify each change in amplitude in the analog signal.

The preferred processing computer 18 is a PENTIUM® or equivalent personal computer easily brought to the location of the receiver stations 12. Of course, higher level computers may be employed, but expense and difficulty of implementation will be increased. Generally, the location of the receiver stations 12 in a hydraulic fracturing operation is in one or more wells disposed underground at some distance from where the fracturing is being conducted. These locations are typically remote and typically lack any building or other structure which could provide a suitable environment for higher level computers. The ability to easily transport the processing computer 18 to various on location sites contributes to the ability to efficiently conduct high speed time analysis.

The processing computer 18 acquires blocks of data from the converter corresponding to a time slice of information taken throughout the receiver stations 12. Each block of data includes microseismic data from the receiver stations over a period of time, which is to be quickly analyzed by the processing computer 18 for potential events. Of course, more powerful computers enhance both the speed and potential number of channels which may be used. As such computers become more portable, or if a fixed location test is used, the alternate computer may be readily adapted to the present invention.

Figures 2, 2A:
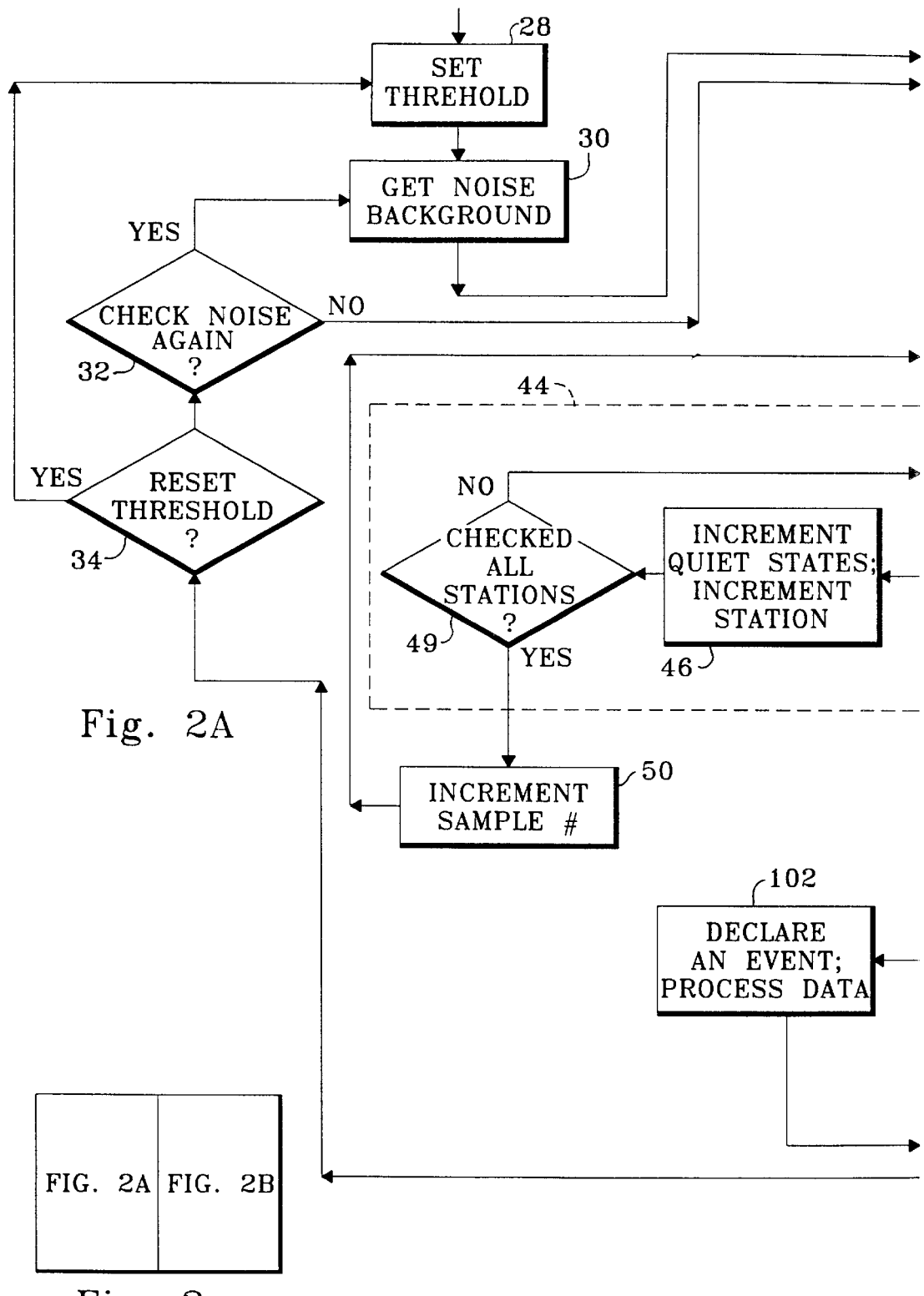
FIG. 2 is a flow diagram of an event comb detection algorithm for the event detector constructed in accordance with the present invention.
Figure 2B:
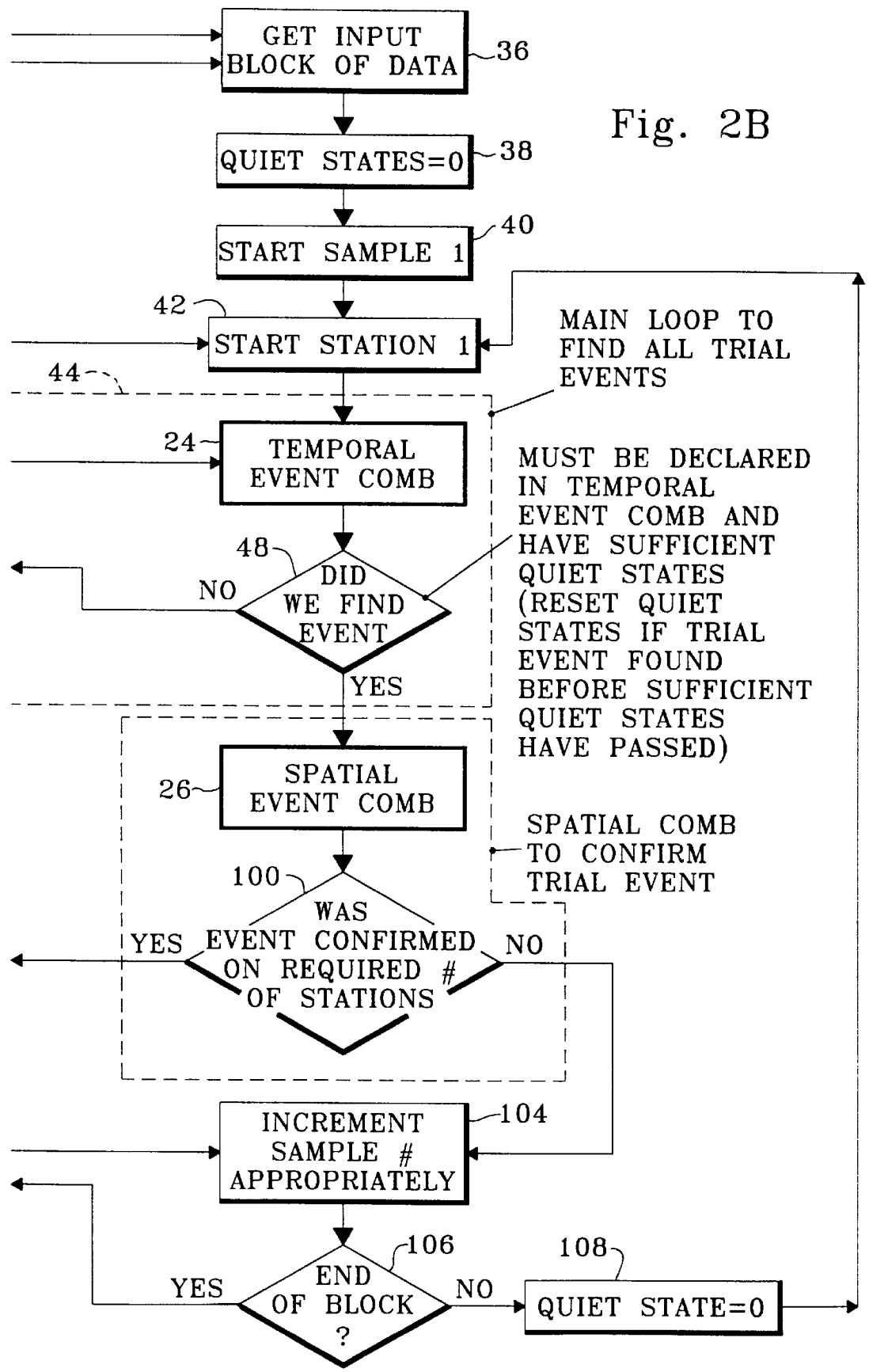

The event comb algorithm of FIG. 2 conducts accurate and efficient real time detection of microseismic events in the digitally converted data signals output from the converter 16. The event comb of FIG. 2 coordinates and implements temporal 24 and spatial 26 combs, respectively shown in FIGS. 3 and 4, using a derivative based point analysis of data signals output from the converter.

Referring now to FIG. 2, a flow diagram is shown for an event comb in accordance with the present invention, which is implemented in the processing computer 18 of FIG. 1. Preliminary determinations in the event comb focus upon the cultural noise present in the signals from receiver stations 12. Step 28 sets a threshold multiple THRESHOLD to be used by the temporal event comb 24 and the application of the temporal event comb 24 by the spatial event comb 26. THRESHOLD contributes to the determination of a trip level TRIP LEVEL used in the temporal comb 26 according to the following relationship:

$$\text{TRIPLEVEL} = \left[ \frac{d\text{NOISE}}{dt} \times \text{THRESHOLD} \right]^2$$

A value for THRESHOLD is determined according to the spatial configuration of the array of receiver stations 12. The value may be fixed if a particular spatial configuration of the receivers sampled remains consistent, or may be selected automatically by the event comb to correspond to a particular spatial sampling configuration if the spatial sampling configuration is varied. In a spatial configuration where sampled receiver stations 12 are spaced in a single well so that the receivers 12 are all co-linear (as illustrated in FIG. 1), then THRESHOLD should be set to at least 4. In the co-linear arrangement, directional information concerning the microseismic waves is derived from the amplitude characteristics of the initial compressional wave, thereby requiring the obtained signal to be well above the ambient noise level. Alternatively, a spatial sampling arrangement of receivers in separate wells allows the THRESHOLD to be reduced as low as 2 because directional information may be obtained by triangulation and the amplitude difference between signal and noise is less important, although the signal must still be distinguishable above the noise.

In either of the co-linear or separate well arrangements, the character of the noise will also affect selection of THRESHOLD. Where the cultural noise is characterized by a relatively constant amplitude, with variations from the relatively constant amplitude being slight, a THRESHOLD on the low side (approaching or equaling 4 for co-linear arrangement, and approaching or equaling 2 for the separate well arrangement) may be used. On the other hand, if the noise has a similar characteristic to the seismic signals of interest, larger values for THRESHOLD should be employed.

An ambient noise background level is determined (step 30) by finding the maximum value of the noise derivative for each receiver station channel over a selected time period. The noise level is defined by the maximum of the squared amplitude derivative of the noise signal for each receiver channel over a period of time, $$\text{AMBIENTNOISE} = (T)_{MAX} \left[ \frac{d\text{NOISE}}{dt} \right]^2$$

Once set, THRESHOLD and the ambient noise level may be maintained, or reset (steps 32 and 34) after analysis of each data block obtained by the processing computer 18. If external ambient conditions remain fairly constant, maintaining the values throughout a hydraulic fracturing, for instance, may be acceptable. Alternatively, when the fracturing occurs over a substantial time period, or the environment is less stable, then the values may be checked and reset periodically to preserve accuracy.

A block of data corresponding to a time sliced sample signal from the array of receiver stations 12 is obtained by the processing computer 18 (step 36) to commence combing operations after the preliminary setting of THRESHOLD and determination of noise level. The block of data corresponds to a sampled signal over a period of time for all, or a significant number of, the receiver stations 12. An exemplary time slice would be 5 seconds in width. A counter for quiet states is reset to zero (step 38) before commencement of combing (step 40) through the obtained block of data. Within the block of signal data, a first station, e.g. a selected one of the receiver stations 12, is set to be checked (step 42). Trial events are declared in the main loop 44 which is driven primarily by the temporal event comb 24. However, declaration of a trial event is inhibited until a sufficient number of quiet states have passed.

Maintaining a minimum count of quiet states prior to trial event declaration insures that a signal potentially indicative of the beginning of a microseismic event is not the latter stages of a previous microseismic event. The setting of an appropriate number of quiet states depends upon both the frequency of the microseismic events being studied and the type of receiver used for sensing. Assuming that the measured time of a quiet state remains constant, if the frequency of interest is low, then a larger number of quiet states should be used than when the frequency of interest is high. Where potential exists for detecting both types of events, the low frequency events should be used to determine the number of quiet states because detection of high frequency events will not be adversely affected by using more than the required number of quiet states, although the number of declared high frequency events may be less than desired. In addition, if a low frequency receiver is used, such as a geophone, the number of quiet states should be higher because the geophones have a higher sensitivity for lower frequency microseismic events.

Frequency matching between the frequency of the microseismic events and the A/D sampling rate also plays a role in setting a number of quiet states. Preferably, if the frequency of the signal data from the receivers 12 is closely matched (sampling rate of approximately 4–8 times the primary frequency of the signal data) to the frequency of the microseismic events in the signals from the receivers, then the number of quiet states may be set in the approximate range of 50–200. In contrast, a high sampling rate compared to the primary frequency should use a higher number of quiet states, preferably in an approximate range of 200–1000.

The main loop 44 increments the number of quiet states (step 46) when the temporal comb 24 detects no event. If all of the receiver stations 12 have not been checked (step 49=NO) the temporal comb 24 is executed again. Alternatively, if all the stations in sample 1 have been checked without detection of an event (step 49=YES), the sample number is incremented (step 50) to run the main loop 44 on a subsequent sample from the obtained signal data block.

Figure 3A:
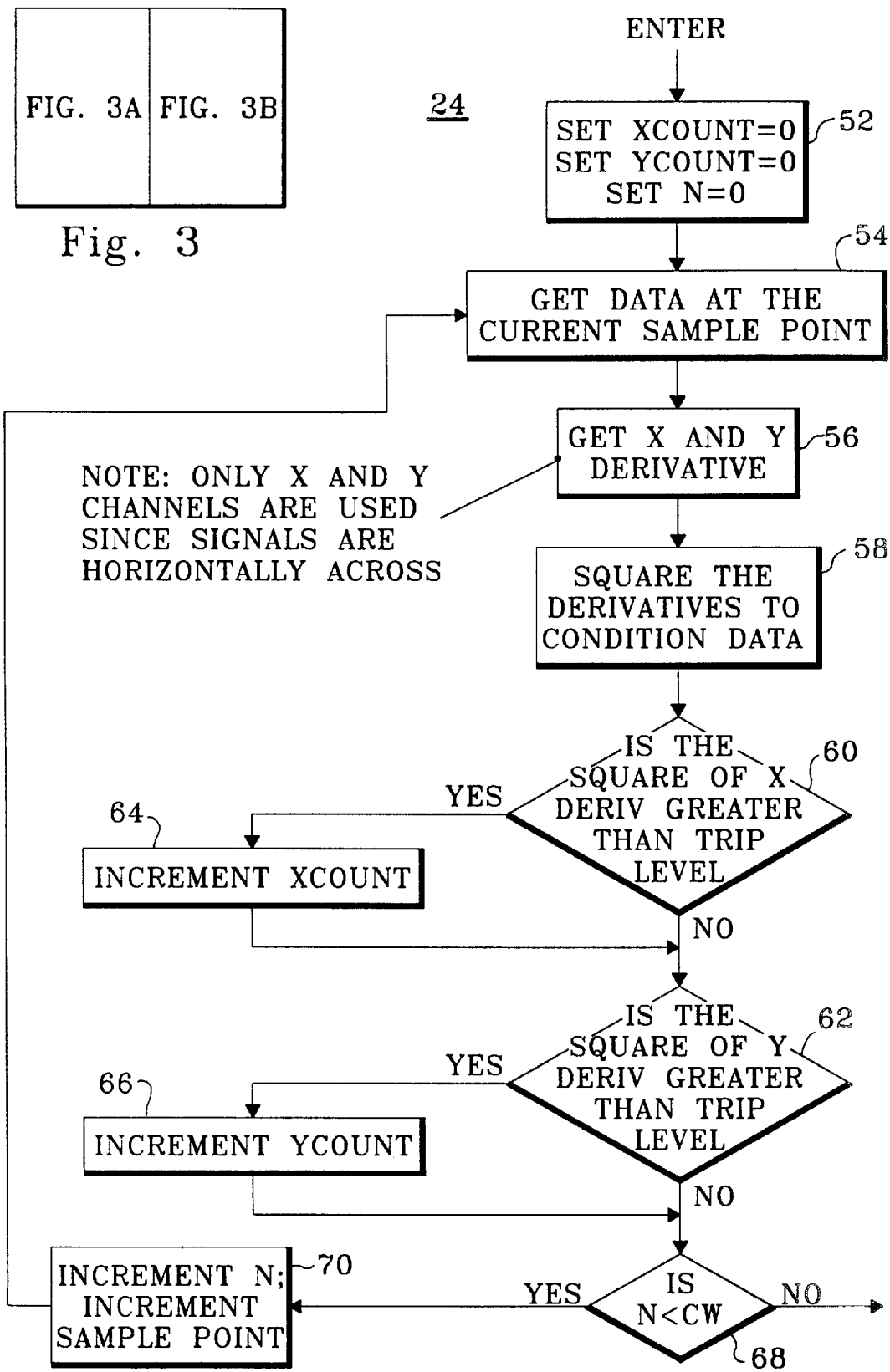
FIG. 3 is a flow diagram of a temporal event comb algorithm for the temporal event comb shown in FIG. 2.
Figure 3B:
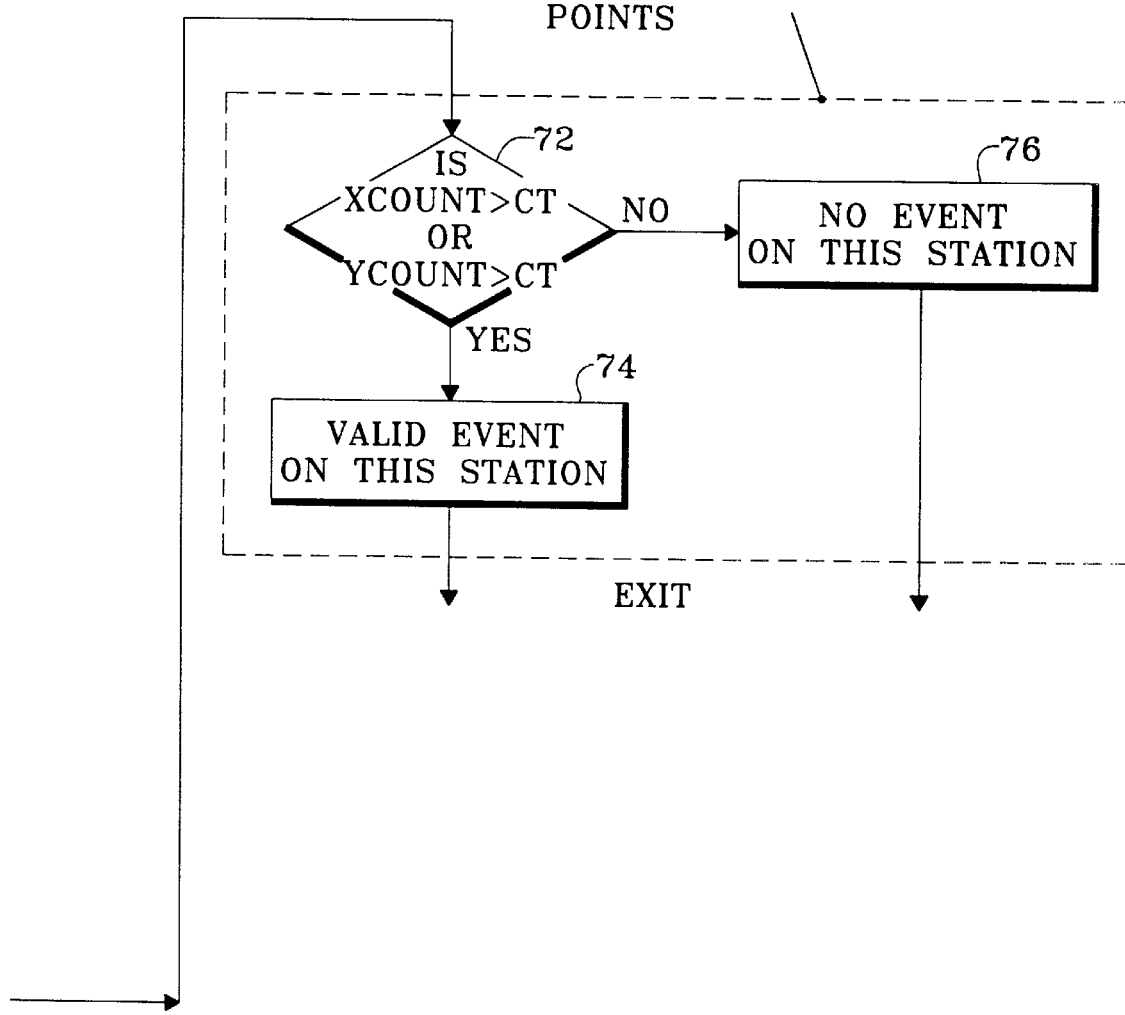

Referring now to FIG. 3, the temporal comb 24 used to detect trial events in the main loop 44 will be described in further detail. Upon initial execution of the temporal comb 24, variable counts are set to zero (step 52). N tracks through the number of sample points within a given sample number, for instance 7 points corresponding to 0.875 ms, during execution of the temporal comb 24 algorithm. In the illustrated embodiment XCOUNT and YCOUNT are also set to zero because the illustrated temporal comb examines signals corresponding to the X and Y channels of a selected receiver station 12. Alternatively, or in addition, if the Z axis channel was also considered, then a ZCOUNT variable would be set to zero. The illustrated embodiment corresponds to an embodiment in which the general directional origin of potential microseismic events will be displaced upon the X and Y axes vis a vis the receiver stations 12. If events were also possibly originating below the receiver stations 12, then the Z axis would be considered, and a variable ZCOUNT would also be set to zero.

Amplitude data corresponding to the current data point N, beginning with the second point in the sample block acquired in step 36 is obtained (step 54), and derivatives along the selected axes (X and Y in FIG. 3) are determined (step 56). The derivative for a given sample point is obtained by finding the amplitude difference along the selected axes between that sample point and a prior sample point. If the time between the sample points remains fixed, there is no need to make a separate determination of the elapsed time between sample points, and derivative calculation is accordingly simplified to a simple subtraction. Obtained derivatives are squared (step 58) to enhance the difference between signal and noise. Further separation is possible by use of higher exponentials, but significant processing speed is sacrificed in the more complex calculations.

Separate steps are then used for each selected axis to determine whether the squared derivative exceeds TRIP LEVEL. In the illustrated embodiment, the X axis (step 60) and Y axis (step 62) derivatives are compared to TRIP LEVEL. Affirmative determinations that the selected axis derivatives exceed TRIP LEVEL result in incrementation of the respective XCOUNT and YCOUNT variables (steps 64 and 66). Amplitude and timing information concerning the first sample point for which the derivative exceeded TRIP LEVEL is retained by the processing computer 18 along with subsequent sample point information. If later confirmed by the spatial comb 26, the first sample point having a derivative exceeding TRIP LEVEL indicates the beginning of a microseismic event. In addition, the first sample point provides a starting point for re-execution of the temporal comb 24 when the spatial comb 26 attempts to confirm a potential (or trial) microseismic event. The spatial comb 26 will attempt confirmation on another receiver station 12 at a time beginning at the first sample point N having a derivative exceeding TRIP LEVEL.

Combing in this fashion using the squared derivatives is continued on a point basis by incrementing N through the sample over a defined comb width CW, which corresponds to a particular number of sample points, 7 for instance, defining a corresponding width in time. When the comb width CW has not been met (Step 68=YES) the sample point number N is incremented (Step 70) prior to continuing by getting data for a new sample point corresponding to number N (Step 54).

Comb width CW therefore defines the number of sample points in the temporal event comb. At each sample point, defined by N, a 2 point derivative of the data is calculated, squared, and compared to TRIP LEVEL. Factors governing an appropriate value for CW include the frequency of the microseismic signals of interest, the conversion (sampling) rate of the A/D converter 16, and the processing limitations of the processing computer 18. When the microseismic data frequency and the sampling rate are closely matched then CW may be set near 10, a range of approximately 7–10 being acceptable. Seven points assures rejection of non-microseismic signals in most cases, while presenting a minimal processing burden. Where the frequency of the microseismic signals of interest is low compared to the sampling rate, CW should be substantially increased, for instance to 100.

Once the derivatives have been taken over the comb width CW, the sample point number N becomes equal to CW (Step 68=NO) and comparisons are made to see if a trial event has been found (Step 72). If either XCOUNT or YCOUNT exceeds a comb trip number CT, then a valid event is declared on the station (Step 74). A negative determination finds no event on the station (Step 76). The determinations of events (step 74 and 76) provide information to decide whether a trial event has been found (Step 48) in the main loop 44 of FIG. 1.

The comb trip number CT is preferably set in the range of 30–50% of the comb width CW. CT also influences the determination of quiet states in the main loop 44 of FIG. 1. As has been discussed, a sufficient number of quiet states is necessary before a trial event will be declared (Step 48). In essence, the number of quiet states corresponds to the number of sample points in which TRIP level has not been exceeded on CT of the CW sample points. Accordingly, until a sufficiently long quiet period has passed no trial event will be declared even if the temporal comb discovers what would otherwise be a trial event. When the temporal comb 24 discovers a potential trial event before a sufficient number of quiet states have passed, the quiet state count will be reset and a declaration of trial event will be inhibited (Step 48). Execution of the main loop 44 resumes with the quiet states reset to zero. Use of quiet states serves to distinguish the initial compressional wave indicative of the beginning of a microseismic waves from the latter waves of an event which has already begun.

Where no potential trial event is found by the temporal event comb 24, the finding of no trial event (Step 48=NO) results in incrementation of the quiet states counter and continuation of checking through the same sample or another sample. In the event comb of FIG. 2, when a trial event is declared (Step 48=YES after sufficient quiet states) the spatial comb 26 is executed to confirm the trial event on another receiver station. Confirmation by spatial combing reduces the possibility that the station which resulted in the declaration of a trial event in the main loop 44 responded to conditions other than a microseismic event, or was defective in operation.

Figure 4A:
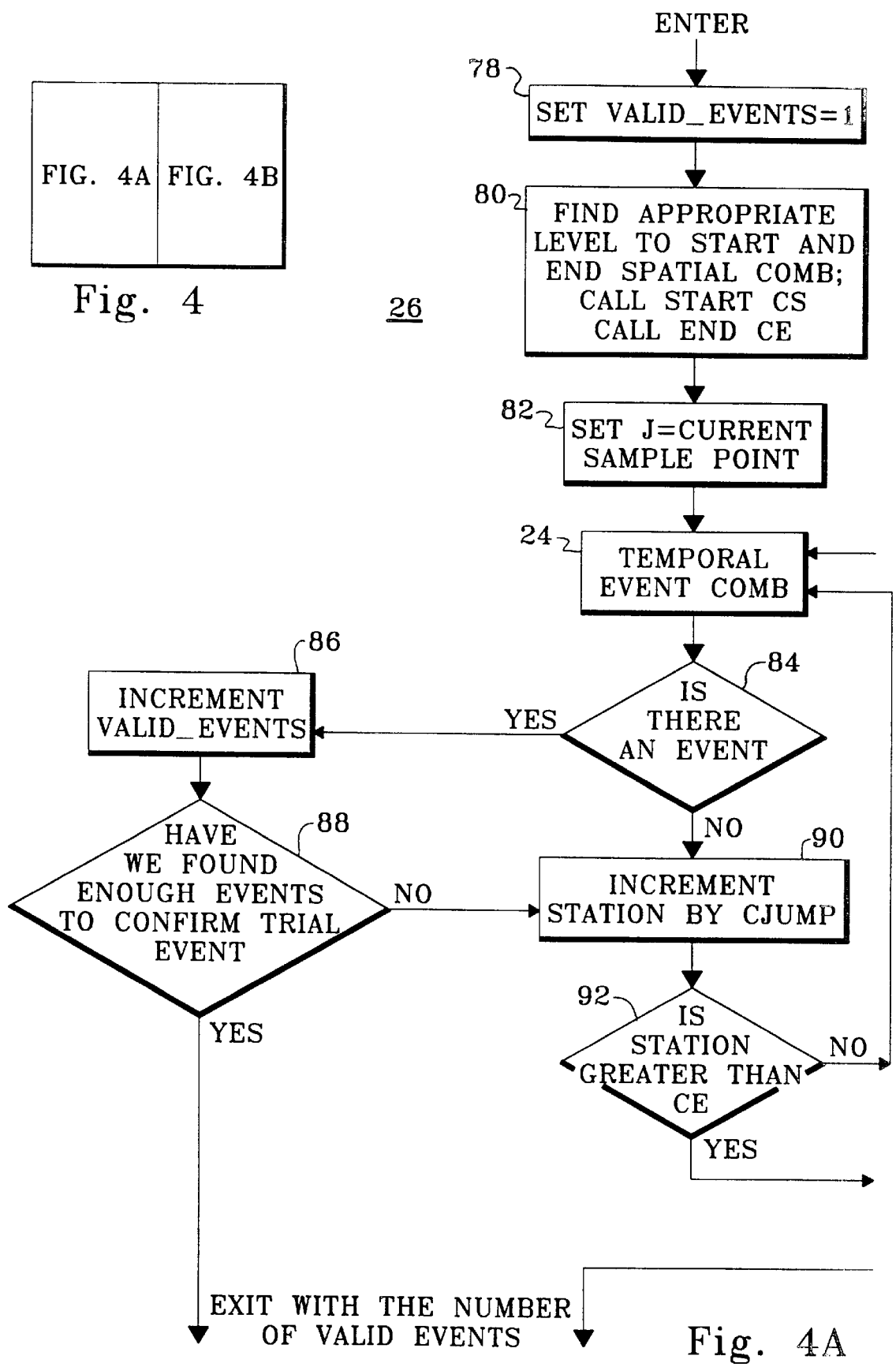
FIG. 4 is a flow diagram of a spatial event comb algorithm for the temporal event comb shown in FIG. 2.

Referring now to FIG. 4, a spatial comb algorithm is shown constructed in accordance with the present invention to be executed according to the event comb of FIG. 2 within the processing computer 18. The spatial comb 26 tests a trial event detected by the temporal event comb 24 on one receiver station by applying the temporal event comb 24 to other receiver stations within the array of receiver stations 12.

Since a trial event has been declared by prior to execution of the spatial event comb 26, a valid event counter VALID_EVENTS is set to 1 (Step 78). A start level is determined (Step 80) with reference to start station CS and end station CE parameters. Each of these parameters is defined with respect to the initial station which resulted in declaration of a trial event when the temporal comb 24 was executed in the main trial loop of FIG. 2. Labeling the station which resulted in the initial declaration of a trial event as CTRIAL, CS and CE may be defined with reference to CTRIAL. Another parameter CJUMP defines the number of receiver stations 12 which will be skipped over in execution of the spatial comb 26, and also plays a role in determining CS and CE.

Generally, a number of receiver stations 12 on either side of CTRIAL should be checked to verify a trial event. If a large number of receiver stations exist, every second or third receiver station could be checked by the spatial comb 26 to verify a trial event, in which case CJUMP would respectively be set to 2 or 3 stations. If only a few stations exist, e.g. 3–4, then CJUMP should be set to 1 station. The following exemplary relationship definitions for CS and CE provide for a verification of a trial event on either side of CTRIAL:

For CJUMP=1, CS=CTRIAL−2 and CE=CTRIAL+2

For CJUMP=2, CS=CTRIAL−4 and CE=CTRIAL+4

In either case, the spatial comb 26 will apply the temporal comb 24 to stations on either side of CTRIAL (above and below a given CTRIAL station 12 in FIG. 1). Of course, the pattern may be altered to suit a given application, such as a receiver station arrangement including receiver stations 12 in separate wells, instead of the strictly co-linear single well configuration illustrated in FIG. 1. In the multi well arrangement, the spatial comb 26 would preferably confirm trial events by applying the temporal event comb 24 to receiver stations both in the CTRIAL well and in one or more of the other receiver wells.

CS and CE are called up to set the beginning and ending stations for execution of the spatial comb 26 (Step 80). A variable J tracks the current sample point which is initially set according to the first point at which a derivative exceeded TRIP LEVEL in the station which lead to declaration of the trial event when the temporal comb was executed in the main loop 44. Having set a beginning station CS and a beginning sample points, the temporal comb 24 is executed by the spatial comb 26 with incrementation of sample points in the temporal comb 24 accomplished by adding the variable N of the spatial comb to the variable J. Since N is set to zero (Step 52) at the commencement of the temporal comb 24, J defines the first (current) sample point in the spatial comb execution of the temporal comb 24. After entry, N will increment as described above until N=CW (Step 68=NO). The temporal comb 24 returns control to the spatial comb upon determination of whether an event was found (Steps 74 or 76).

If an event was found (Step 84=YES), the spatial comb increments VALID_EVENTS (Step 86) and tests to see if a sufficient number of valid events has been found to confirm the trial event (Step 88). At a minimum, events should be confirmed on two stations, but four are preferred. If enough events have been indicated by VALID_EVENTS (Step 88=YES), execution of the spatial comb 26 is stopped. Where enough events have not been found for confirmation (Step 88=NO) incrementation of the station by adding CJUMP occurs (Step 90). The temporal comb 24 is executed again if the final station, as defined by CE, has not been reached (Step 92=NO).

Where the station defined by CE has been checked with the temporal comb 24 (Step 92=YES), sample point counter J is incremented (Step 94), and a comparison is made of J to CWS. CWS is similar to CW in operational effect, but defines the width of the spatial comb. The width CWS is wider than CW because a microseismic event which resulted in the declaration of a trial event may impinge upon different receiver stations 12 at different times. Accordingly, confirmation is not abandoned until a wider width in time CWS than CW is checked.

CWS is dependent upon the distance of separation between receiver stations, formation velocity of microseismic waves of interest, and the sampling rate of the A/D converter 16. Close spacing of the receiver stations 12 reduces differences in arrival times at different stations, allowing CWS to be relatively small, e.g. 100 sample points, corresponding to approximately 12.5 mS when the A/D conversion rate is set at 8000 Hz. Widely spaced receiver stations may require significantly larger values, increasing CWS by up to a factor of 10 or more. Similarly, fast traveling waves having high formation velocities will reach separated receiver stations at closely spaced timings, allowing the relatively small value for CWS. Because formation velocities seldom vary by more than a factor of 2, slow velocities may require that CWS be doubled. Use of a higher sampling rate acquires more sample points per unit time and accordingly requires a corresponding increase in CWS to maintain a selected time period width CWS for confirmation of a trial event.

Where J has not yet exceeded CWS (Step 96=NO), execution of the spatial comb continues by resetting the receiver station to CS (Step 98) and executing the temporal comb 24 with the new sample point value J. The spatial comb operation is ceased with a confirmation of an event (Step 88=YES) or without confirmation (Step 96=YES).

A practical example is helpful to illustrate the spatial comb's use of the temporal comb 24. Assume that the point at which a trial event was declared is point 150 in a sample. When the spatial comb 26 begins a confirmation J is set to 150 (Step 82). Upon initial execution of the temporal comb 24, J=150 is added to N=0 to set N to the current sample point 150 (Step 54). The temporal comb 24 then runs through sample points 150–156 (where CW=7), before returning control to the spatial comb 26. This process is repeated on other stations with J set to 150 until a trial event was confirmed (step 88) or the station counter surpasses CE (step 92). In the latter case, J is incremented to a new point, such as point 151 (step 94), the spatial comb width CWS is checked, and the process is repeated on stations CS through CE with the current sample point set by J=151 (Steps 98, 24, 84, 86, 88, 90, 92, 94 and 96).

Referring again to FIG. 2, confirmation of an event by the spatial comb 26 (Step 100=YES) results in declaration of an actual microseismic event (Step 102). No declaration of an actual event occurs if the spatial comb 26 did not confirm the trial event on a sufficient number of receiver stations 12 (Step 100=NO). In either case, the sample number is incremented (Step 104) to designate another sample beginning point in the data block which was acquired in step 36. If the end of the data block has not been reached (Step 106=NO), the quiet state counter is reset (Step 108), and processing of the new sample in the acquired data block continues on the first station (Step 42). Alternatively, if the end of the data block is reached (Step 106=YES), the initial preparations are made before acquiring a new input block (Steps 28, 30, 32, 34 and 36).

As will be appreciated by those skilled in the art, the complete execution of the event comb described above, including the particular temporal comb 24 and spatial comb 26, quickly and accurately discerns and declares the commencement of microseismic events propagating to and impinging upon the receiver stations. The processing computer 18 saves amplitude and timing information concerning the beginning sample point at which a confirmed trial event was detected, e.g. the first sample point at which a squared derivative exceeded TRIP LEVEL, and subsequent sample point information. Subsequent processing after the automatic detection of the beginning point of a microseismic event may be conducted by any conventional or yet to be discovered techniques to discern particular characteristics of the microseismic event. Once the point(s) indicative of event beginning(s) have been determined, full analysis may be conducted on corresponding portions of the digital microseismic data stored in the storage memory 20. Additionally, the processing computer 18 may control storage of data in the storage memory 20 so that only data corresponding to actual detected events is stored for later analysis.

These and other modifications will be readily apparent to artisans as falling within the scope of the present invention. While a particular embodiment of the invention has been described, the scope of the present invention is not limited thereto, and is appropriately determined by reference to the appended claims and their legal equivalents.

What is claimed is:

1. A microseismic event detector comprising:
   a plurality of receiver stations disposed to sense microseismic waves and which produce signals corresponding to microseismic waves impinging upon the stations; and
   a processor for analyzing the signals produced by the stations, wherein said processor includes,
   temporal comb means for combing through a plurality of temporally separated samples within a signal produced by a selected one of said plurality of stations to detect microseismic events indicated by a plurality of temporally separated samples exceeding a trip level threshold, and
   spatial comb means for combing through a plurality of temporally separated samples on another one or more of said plurality of stations to confirm a detected microseismic event after an event has been detected on said selected one of said plurality of stations by applying said temporal comb means to said another one or more of said plurality of stations.

2. A microseismic event detector according to claim 1, said processor further comprising noise determination means for determining an ambient noise level associated with said selected one of said plurality of stations, wherein said processor inhibits confirmation of an event by said spatial comb means until a predetermined number of quiet states, measured using said ambient noise level, have passed.

3. A microseismic event detector according to claim 1, further comprising:
   an analog to digital converter for converting signals from said stations, wherein
   said temporal comb means determines two-point derivatives, on a point by point basis, of an analog to digital converted signal from said selected one of said plurality of stations, squares the two point derivatives, and declares a trial event when a predetermined trip number of squared derivatives exceeds a said trip level threshold.

4. A microseismic event detector according to claim 3, wherein each of said plurality of stations comprises three directional receivers for respectively detecting microseismic waves propagating along X, Y and Z coordinate axes, the signals from said directional receivers forming three channels for each station corresponding to each of the directional receivers, and wherein said temporal comb determines said two point derivatives along a selected one of said X, Y and Z coordinate axes.

5. A microseismic event detector according to claim 4, wherein said directional receivers each comprise an accelerometer.

6. A microseismic event detector according to claim 2, wherein said predetermined number of quiet states is proportional to the frequency of the microseismic event to be detected, and is set higher for low frequency microseismic events and smaller for high frequency microseismic events.

7. A microseismic event detector according to claim 3, wherein said temporal comb examines two point derivatives over a temporal comb width and said predetermined trip number is set in the approximate range of 30 to 50% of said temporal comb width.

8. A microseismic event detector according to claim 7, wherein said spatial comb confirms a trial event detected by said temporal comb by causing said temporal comb to be applied to said another one of said plurality of receivers over a spatial comb width, said spatial comb width being larger than said temporal comb width.

9. A microseismic event detector according to claim 3, wherein said temporal comb means determines the two-point derivatives by determining the amplitude difference between two successive points of said analog to digital converted signal from said selected one of said stations.

10. A microseismic event detector according to claim 8, wherein said analog to digital converter has a resolution of at least 20 bits and digitizes at a constant rate corresponding to said constant value, said constant rate having a minimum value of 8000 bits per second.

11. A method for detecting microseismic events in a continuous stream of microseismic signal data obtained from a plurality of receiver stations disposed to sense microseismic waves impinging thereon, the method comprising the steps of:
   determining an ambient noise level present in signals obtained from said plurality of stations;
   combing through time by derivative transforming the signal data from a selected one of said stations, and comparing an obtained derivative transform value to a trip level threshold;
   declaring a trial microseismic event when the derivative transformed value exceeds said trip level threshold; and
   combing through space to verify a declared trial microseismic event by applying said combing through time step to another one of said plurality of stations; and
   declaring a valid microseismic event when said comb through space reveals that the trip threshold was exceeded by a derivative transformed value obtained from said another one of said plurality of stations.

12. A method for detecting microseismic events according to claim 11, further comprising the step of:
   waiting a predetermined number of quiet states determined by comparing signal data from said selected one of said plurality of stations to said ambient noise level, before conducting said combing through time step.

13. A method for detecting microseismic events according to claim 11, wherein said combing through time step comprises:
   obtaining the derivative transformed value by finding an amplitude difference between consecutive data points in said signal data from said selected one of said receivers;

comparing the derivative transformed value for the consecutive data points to said trip level;

repeating said steps of obtaining and comparing on sets of additional consecutive data points over a temporal comb width, counting consecutive derivative values exceeding said trip level over said temporal comb width, and declaring a trial event when a predetermined trip number of consecutive derivative values exceeds said trip level threshold over said temporal comb width.

14. A method for detecting microseismic events according to claim 13, further comprising the step of:

conducting said combing through time step on another one of said plurality of stations when said predetermined trip number is not exceeded when the combing through time step is applied to said selected one of said plurality of stations.

15. A method for detecting microseismic events according to claim 13, wherein said step of combing through space comprises:

shifting said temporal comb to another one of said stations after a trial microseismic event has been declared and applying the temporal comb to said another one of said plurality of stations over a spatial comb width, said spatial comb width being wider than said temporal comb width;

continuing said shifting after each declaration of a valid microseismic event until the temporal comb has been applied to a predetermined number of said stations while maintaining a count of valid events;

declaring an actual event when the count of valid events exceeds a predetermined count.

16. A method for detecting microseismic events according to claim 15, wherein each of said plurality of stations are disposed at different locations and step of shifting is continued in a pattern through said plurality of stations, said pattern including receivers on either side of said selected one of said plurality of stations.

* * * * *